United States Patent Office 2,834,745
Patented May 13, 1958

2,834,745

METHOD OF PRODUCING CRESOL-FORMALDE-HYDE POLYMER COATING COMPOSITIONS

Gene C. Weber, Hermosa Beach, Robert P. Hoyt, Redondo Beach, and Robert L. Dinsmore, Long Beach, Calif., assignors to Richfield Oil Corporation, Los Angeles, Calif., a corporation of Delaware No Drawing. Application February 5, 1954
Serial No. 408,568

5 Claims. (Cl. 260—32.8)

This invention relates to resinous coating compositions which when applied to exposed surfaces protect them against deterioration or attack by the elements. More particularly, our invention is concerned with resinous coating compositions comprising a phenol formaldehyde polymeric material, an inert filler, and a low boiling alcoholic or ketonic solvent, and with the method of manufacturing these compositions. This invention further specifically relates to the utilization of these resinous compositions as surface coatings on a base material. Our invention is also concerned with intermediate resinous solutions containing the phenol formaldehyde polymeric material in the noted solvents.

We have devised a method of preparing phenol formaldehyde resinous coating compositions and intermediate resinous solutions which can be stored for considerable periods after formulation without undue hardening. Also when the coating compositions are applied to the surfaces of articles they cure under normal atmospheric conditions. As known, phenol formaldehyde resins are formed by gradual polymerization, that is the reaction products go through vaious stages of viscosities before final hardening or curing to a thermosetting resin. We have found that by regulation of the reaction of the phenolic material and the formaldehyde according to a specific procedure we produce resinous coating compositions which are viscous liquids at room temperature and which can be stored for considerable periods and then applied to a surface in the form of a continuous coating under normal atmospheric conditions. The intermediate resinous solution of the phenol formaldehyde material in the designated solvents can also be stored for considerable periods and can be marketed in this form; however, without the addition of the proper amount of a suitable filler this solution will not form the desired surface coating.

Our resinous coating compositions may be applied to a surface by brushing or spraying or any other convenient method usually after dilution with a suitable solvent and when dried or cured on the surface form a highly protective coating. The coating so formed is a substantially impervious layer, and thus protects the surface not only from the surrounding elements but also decreases deterioration by preventing escape of volatile constituents from the surfaces essential to their well-being. Asphaltic materials such as roofing compositions slowly deteriorate due to the actions of sunlight, heat, moisture, and air which cause loss of volatile constituents and effect oxidation. When hydrocarbons of various types are allowed to come into contact with the asphaltic materials they tend to dissolve and soften the asphalt resulting in disintegration of its surface. Our coating compositions protect these asphaltic materials from the destructive action of hydrocarbon spills and the weathering action of the elements.

Steel equipment such as buried pipe lines are subject to corrosive galvanic action which is partly a function of soil conditions. Similarly, steel storage tanks are subject to corrosive action by stray electrical currents in the presence of a conducting medium such as water. When applied to such metal surfaces after suitable priming our coating compositions form an impervious water-proof layer, thereby reducing the possibility of galvanic corrosion. The substantial insolubility of our coating compositions in hydrocarbons of aliphatic, aromatic and alicyclic structure make them suitable products for coating steel equipment coming into contact with these hydrocarbons. Additional applications of our coating compositions include their use as sealers for asphalt, cements, and other materials susceptible to cracking by application when in the intermediate viscous liquid state to the cracks of these materials followed by subsequent drying of the resins. Other uses for our coating compositions are apparent and in general they can be utilized as protective coatings on the surface of any given article or base material, e. g., wood, steel, masonry, synthetic resins, etc.

Our coating compositions comprise three essential ingredients which are: a phenol formaldehyde resin, an inorganic filler, and a low boiling alcoholic or ketonic solvent. A fourth ingredient which we prefer to incorporate into the compositions is an organic or inorganic pigment. However, the fourth ingredient is not essential to the physical texture and to the protective nature of the composition but rather its principal function is that of imparting a desired color to the coating compositions.

The phenol formaldehyde resins of our composiitons are formed from phenolic and formaldehyde components well-known in the art. Those resins which are useful are produced under the action of an alkaline catalyst and polymerized while passing through intermediate liquid stages to the hard or cured stage. After curing the polymers are capable of being thermoset, insoluble in common liquid hydrocarbon solvents, and not materially affected by normal temperature changes. The various phenolic constituents which when polymerized with the formaldehyde produce the desired resins not only include phenol itself but also cresols, xylenols and phenolic homologs and derivatives having at least one hydroxyl group in the molecule as well as mixtures thereof. We prefer to utilize cresylic acid as our phenolic material. Formaldehyde is the preferred aldehyde, but other equivalent aldehydes can be used, for instance, aliphatic aldehydes and furfuraldehyde. Paraformaldehyde or other formaldehyde-yielding compounds can also be employed. The quantity of formaldehyde used can be varied from about ¼ to 5 mols per mol of phenolic material, with the range of ½ to 1½ mols of formaldehyde per mol of phenolic material being preferred. The phenol formaldehyde polymeric material comprises about 25 to 97 parts by weight of our compositions with about 50 to 70 parts being preferred.

Suitable alkaline catalysts are the alkali metal salts of groups 1 and 2 such as NaOH, LiOH, KOH, $Ca(OH)_2$ and $Ba(OH)_2$, and the carbonates of group 1. The catalysts also include ammonia and its basic reacting derivatives, oxides such as magnesium oxide, alkali sulfites, and alkali metal salts of phenolic compounds such as sodium cresylate. The amount of catalyst utilized can vary from about 0.1 to 10% by weight based on the total charge.

The inert filler of the coating compositions of the present invention can be any finely graded compatible substance generally classed as organic or inorganic resin fillers. Among these fillers are spent gasoline catalyst dust, fuller's earth, diatomaceous earth, graphite, asbestos (powder and fiber), barytes, talc, slate, mica, metal powders, e. g., iron and copper, cotton linters, wood flour, sisal, clays and cements. Of course mixtures of the various fillers may also be utilized. Our coating compositions contain about 5 to 60 parts by weight of the filler with about 25 to 40 parts being preferred. The filler mesh size can be up to about 50 mesh with about 100 to 200 mesh being preferred.

In formulating the phenol formaldehyde coating compositions and intermediate solutions a low boiling alcoholic or ketonic solvent is utilized and is a part of the compositions when they are in the intermediate viscous liquid stage. These low boiling solvents include the lower aliphatic alcohols and ketones which will volatilize under normal atmospheric conditions to effect the drying of the coating compositions and which dissolve the phenol formaldehyde resins when they are in the intermediate viscous liquid stage. The alcohols include for instance, primary, secondary, and tertiary aliphatic alcohols such as methanol, ethanol, propanol, isopropanol, butanol, and isobutanol. The ketonic solvents are exemplified by acetone and methyl ethyl ketone. The solvent forms about 3 to 10 parts by weight of both our intermediate resinous solutions and the filler-containing bulk coating compositions with 5 to 10 parts being preferred.

As previously noted we prefer to incorporate into our compositions an organic or inorganic pigment. The choice of a particular pigment is determined by the color desired, cost, weathering properties of the pigment and the weathering properties desired in the final coating compositions. For example, if a black surface coating is desired lamp black or a carbonaceous asphaltic material can be used. The pigment forms about 1 to 5 parts by weight of our coating compositions.

In formulating the resinous coating compositions and the intermediate resinous solutions of the present invention it is necessary to control closely several process variables if the desired resinous compositions be produced from the above noted ingredients. The intermediate solution is a viscous liquid which remains in that state over considerable periods and which when diluted with a solvent mixed with the filler and applied to a surface will exhibit a short drying or curing time under normal atmospheric conditions. Prolonged drying periods are particularly disadvantageous when coating vertical or other non-horizontal surfaces since the resin tends to run unless solidification is effected rapidly. Thus, the importance of process control is demonstrated by the fact that the intermediate resinous solution or bulk coating composition must be capable of being stored without unduly hardening and yet when applied to a surface as such or with dilution it must be viscous enough to form rapidly a non-running, quick-drying coating under normal atmospheric conditions.

In preparing our intermediate resinous solution the phenolic material and formaldehyde are mixed with an alkaline catalyst and then reacted at polymerizing temperature until the reaction reaches the point at which virtually all the formaldehyde has reacted and at which the reaction product is still in the fluid state when cooled to a temperature from about 70 to 120° F. The reaction is then stopped by cooling to a temperature from about 70 to 120° F., for instance by water quench, and any water present and the catalyst are removed. Following the catalyst and water removal the resin is reheated to polymerizing temperature until it approaches a viscosity which is such that the resin would be a semi-solid upon cooling to about room temperature. The resin is then cooled and when it reaches a temperature low enough not to effect volatilization of a substantial amount of the solvent, the solvent is added and mixed with the resin to form our intermediate resinous solutions. If desired, the resin may be carried to room temperature before the solvent is added. Alternatively, a small amount of solvent can be added to the hot resin to reduce its viscosity and the balance of solvent is added after cooling. Alternatively, the resin can be prepared by reacting the dry phenolic compound with the formaldehyde in the presence of the catalyst and the reaction stopped by cooling in heat exchange equipment which produces a relatively dry product.

When the bulk resinous coating composition is desired the resin and the solvent are brought to uniform consistency and the filler is then added and the entire composition is thoroughly mixed. The exact temperatures and times of the several stages of our process will vary depending upon the particular phenolic material utilized and the purity of the ingredients. The determination of these exact conditions is a matter of routine experimentation and can easily be effected by merely noting the viscosity and physical texture of the composition at the several stages.

If a pigment be utilized the total amount can be added to the coating composition after the filler is thoroughly mixed. However, we prefer that about 50% of the pigment be added at a temperature of about 100–110° F. as the resin cools from its final polymerization period and the remaining 50% of the pigment is added after the filler has been mixed into the composition.

The viscous liquid intermediate resin solutions and coating compositions produced by following the above procedure have the properties desired. The bulk coating compositions are readily applied to a given surface by brushing, spraying, squeegeeing, or any other means after appropriate dilution with a suitable solvent. Such solvents include the alcohols and ketones used in formulating the solution as well as the other compatible solvents for the phenol formaldehyde resin which are volatile at normal atmospheric conditions. The resinous coating compositions have satisfactory drying times under ordinary atmospheric conditions to enable them to be easily and successfully applied as coatings on surfaces of a given article. However, if desired the drying time can be controlled by varying the amount of solvent used for dilution while taking into consideration the volatility of the solvent. Other variables controlling the drying time are the amount and type of pigment and filler utilized, the weather conditions, and the thickness of the coating applied.

The following specific examples illustrate the preparation of the compositions of our invention but they are not to be considered limiting.

*Example 1*

Sixty parts by weight of a full range petroleum derived cresylic acid and forty parts by weight of 37% formaldehyde solution were mixed with agitation and their temperature raised to about 170° F. at which point 0.9 part by weight of catalyst (50° Bé NaOH) were added to initiate a polymerization reaction. The reaction was continued for about 9 minutes at a temperature range from 200–212° F. and then the mixture was diluted with about three times its volume of cold water to stop the reaction. The water, which formed a separate layer from the oily resin and the catalyst were separated from the resin. The water removed included that produced in the initial stage of the reaction. The liquid resin was then heated at 200–205° F. to complete further the reaction until the material approached a semi-solid state at room temperature. At this point the resin was cooled to stop the reaction, and the product was the intermediate resin solution of our invention. A portion of the solvent isopropyl alcohol was added to reduce the viscosity of the solution. When the temperature of the resin had reached 100–110° F., 2.5 parts by weight of the lamp black were added. The composition then continued to cool and was diluted at room temperature with the remainder of the 9 parts by weight of isopropyl alcohol. When this mixture had reached uniform consistency by stirring, 40 parts by weight of clay filler were added and the entire mixture was thoroughly stirred. An additional 2.5 parts by weight of lamp black were then added to the composition while mixing. The resulting product was a viscous liquid coating composition. After dilution with isopropyl alcohol the composition was applied as a thin layer to the surface of a steel plate and dried under normal atmospheric conditions to a hard continuous coating.

Example II

The procedure of Example I was repeated employing 2.5 mols of formaldehyde and 1 mol of phenol with a potassium hydroxide catalyst at a concentration of 0.5 weight percent of the total charge.

Example III

The procedure of Example I was repeated employing 2.5 mols of formaldehyde and 1 mol of cresols from catalytically cracked gasoline with a potassium hydroxide catalyst at a concentration of 0.5 weight percent of the total charge. The composition of the cresol on a volume basis was:

|  | Percent |
|---|---|
| Phenol | 11.3 |
| O-cresol | 19.5 |
| m- and p-Cresols | 23.9 |
| O-ethylphenol | 15.2 |
| Xylenols | 14.7 |
| Unidentified | 15.4 |

Example IV

The procedure of Example I was repeated employing 2.5 mols of formaldehyde and 1 mol of cresols from thermally cracked gasoline with a potassium hydroxide catalyst at a concentration of 0.5 weight percent of the total charge. The composition of the cresol on a volume basis was:

|  | Percent |
|---|---|
| Phenol | 4.3 |
| O-cresol | 10.7 |
| m- and p-Cresols | 23.0 |
| O-ethylphenol | 27.3 |
| Xylenols | 34.7 |

Field tests have been made by applying the coating compositions of the examples to asphalt paving at an automotive service station, an aircraft refueling station and a gasoline distributing yard. These areas are subject to spills of gasoline with subsequent solution of the asphalt binder and degradation of the paving. After six months of service during which gasoline spills occurred, the appearance of these pavings was substantially the same as the day when the coatings were applied.

We claim:

1. A method of producing a cresol formaldehyde polymer coating composition containing about 25 to 97 parts by weight of the polymer, said polymer being substantially insoluble in liquid aliphatic hydrocarbons after curing, which comprises heating a mixture of the cresol and formaldehyde containing about ¼ to 5 mols of formaldehyde per mole of cresol, in the presence of a basic catalyst to effect polymerization until the formaldehyde is virtually all reacted and the product when cooled to about 70 to 120° F. is in the fluid state, quenching the reaction mixture with water, immediately removing catalyst and water from the reaction mixture, reheating the reaction mixture to polymerize it until it approaches a semi-solid state when at room temperature, cooling the reaction product, adding to the reaction product about 3 to 10 parts by weight of a solvent selected from the group consisting of low boiling, lower aliphatic alcohols and low boiling, lower aliphatic ketones, said alcohols and ketones being volatile under normal atmospheric conditions, and mixing about 5 to 60 parts by weight of an inorganic filler with the reaction product-solvent mixture.

2. The method of claim 1 in which the cresol is petroleum-derived cresylic acid.

3. A method of producing a cresol formaldehyde polymer coating composition containing about 25 to 97 parts by weight of the polymer, said polymer being substantially insoluble in liquid aliphatic hydrocarbons after curing, which comprises heating a mixture of the cresol and formaldehyde containing about ¼ to 5 moles of formaldehyde per mole of cresol, in the presence of a basic catalyst to effect polymerization until the formaldehyde is virtually all reacted and the product when cooled to about 70 to 120° F. is in the fluid state, quenching the reaction mixture with water, immediately removing catalyst and water from the reaction mixture, reheating the reaction mixture to polymerize it until it approaches a semi-solid state when at room temperature, cooling the reaction product, and adding to the reaction product about 3 to 10 parts by weight of a solvent selected from the group consisting of low boiling, lower aliphatic alcohols and low boiling, lower aliphatic ketones, said alcohols and ketones being volatile under normal atmospheric conditions.

4. The method of claim 3 in which the cresol is petroleum-derived cresylic acid.

5. The method of claim 4 in which the ratio of formaldehyde to cresol is ½ to 1½ moles of formaldehyde per mole of cresol.

References Cited in the file of this patent

UNITED STATES PATENTS

| 1,018,385 | Baekeland | Feb. 20, 1912 |
| 2,245,245 | Alexander | June 10, 1941 |